(12) United States Patent
White, III

(10) Patent No.: US 11,512,604 B1
(45) Date of Patent: Nov. 29, 2022

(54) SPRING FOR RADIALLY STACKED ASSEMBLIES

(71) Applicant: Raytheon Technologies Corporation, Farmington, CT (US)

(72) Inventor: Robert A. White, III, Meriden, CT (US)

(73) Assignee: RAYTHEON TECHNOLOGIES CORPORATION, Farmington, CT (US)

( * ) Notice: Subject to any disclaimer, the term of this patent is extended or adjusted under 35 U.S.C. 154(b) by 0 days.

(21) Appl. No.: 17/307,090

(22) Filed: May 4, 2021

(51) Int. Cl.
*F01D 9/04* (2006.01)

(52) U.S. Cl.
CPC .......... *F01D 9/041* (2013.01); *F05D 2220/32* (2013.01); *F05D 2240/12* (2013.01)

(58) Field of Classification Search
CPC ... F01D 9/041; F05D 2220/32; F05D 2240/12
See application file for complete search history.

(56) References Cited

U.S. PATENT DOCUMENTS

| | | | |
|---|---|---|---|
| 3,767,322 A * | 10/1973 | Durgin | F01D 5/189 415/115 |
| 3,857,649 A | 12/1974 | Schaller et al. | |
| 3,864,056 A * | 2/1975 | Gabriel | F01D 5/08 415/177 |
| 3,992,127 A * | 11/1976 | Booher, Jr. | F01D 25/005 415/200 |
| 4,053,257 A * | 10/1977 | Rahaim | F01D 9/042 415/217.1 |
| 9,970,317 B2 | 5/2018 | Freeman et al. | |
| 10,329,930 B2 | 6/2019 | Roussille et al. | |
| 10,428,663 B2 | 10/2019 | Propheter-Hinckley | |
| 2009/0053050 A1* | 2/2009 | Bruce | F01D 25/246 415/200 |
| 2013/0177400 A1 | 7/2013 | Ring | |
| 2016/0201488 A1* | 7/2016 | Carr | F01D 9/041 29/889.22 |
| 2017/0074110 A1* | 3/2017 | Fremont | F01D 9/041 |
| 2021/0332710 A1* | 10/2021 | White, III | F01D 25/00 |
| 2022/0082024 A1* | 3/2022 | Sobanski | F01D 5/284 |

OTHER PUBLICATIONS

European Search Report for European Patent Application No. 22171682 .2 dated Jul. 5, 2022.

* cited by examiner

*Primary Examiner* — Jesse S Bogue
(74) *Attorney, Agent, or Firm* — Carlson, Gaskey & Olds, P.C.

(57) ABSTRACT

A vane assembly includes a platform. A vane cover is arranged adjacent the platform. The vane cover has a protrusion that provides a spring land. The spring land is arranged at an angle relative to the vane cover. A spring assembly has a plunger. The plunger is in contact with the spring land.

20 Claims, 3 Drawing Sheets

SPRING FOR RADIALLY STACKED ASSEMBLIES

BACKGROUND

A gas turbine engine typically includes a fan section, a compressor section, a combustor section, and a turbine section. Air entering the compressor section is compressed and delivered into the combustion section where it is mixed with fuel and ignited to generate a high-speed exhaust gas flow. The high-speed exhaust gas flow expands through the turbine section to drive the compressor and the fan section.

The compressor or turbine sections may include vanes mounted on vane platforms. Some vanes have been proposed made of ceramic matrix composite materials. Cooling and sealing such vanes may present challenges.

SUMMARY OF THE INVENTION

In one exemplary embodiment, a vane assembly includes a platform. A vane cover is arranged adjacent the platform. The vane cover has a protrusion that provides a spring land. The spring land is arranged at an angle relative to the vane cover. A spring assembly has a plunger. The plunger is in contact with the spring land.

In another embodiment according to any of the previous embodiments, the spring assembly comprises a compression spring compressed between a spring cap and the plunger.

In another embodiment according to any of the previous embodiments, the spring cap is secured to an engine static structure.

In another embodiment according to any of the previous embodiments, a spring housing extends radially inward of the engine static structure to form a spring cavity. The spring housing is secured to the engine static structure via the spring cap.

In another embodiment according to any of the previous embodiments, the plunger is arranged partially within the spring cavity and extends through an aperture in the spring housing.

In another embodiment according to any of the previous embodiments, the spring housing has a seating surface that extends about the aperture. The seating surface is configured to engage a portion of the plunger.

In another embodiment according to any of the previous embodiments, the spring land provides a surface that is parallel to an engine axis.

In another embodiment according to any of the previous embodiments, the platform is a vane outer platform. The spring land protrudes radially outward from the vane cover.

In another embodiment according to any of the previous embodiments, the platform is formed from a ceramic material.

In another embodiment according to any of the previous embodiments, the vane cover is formed from a metallic material.

In another exemplary embodiment, a gas turbine engine includes a compressor section. A combustor is in fluid communication with the compressor section. A turbine section is in fluid communication with the combustor. At least one of the turbine section or the compressor section includes a vane that has an airfoil and a platform. A vane cover is arranged adjacent the platform defining a cavity between the vane cover and an engine static structure. A seal assembly is secured to the engine static structure. The seal assembly extends into the cavity and has a plunger that contacts the vane cover.

In another embodiment according to any of the previous embodiments, the spring assembly comprises a compression spring compressed between a spring cap and the plunger.

In another embodiment according to any of the previous embodiments, the seal assembly is secured at a spring housing. The spring housing forms a spring cavity In another embodiment according to any of the previous embodiments, the vane cover has a protrusion that provides a spring land. The plunger is in contact with the spring land.

In another embodiment according to any of the previous embodiments, the spring land is arranged at an angle relative to the vane cover.

In another embodiment according to any of the previous embodiments, the spring land has a surface that is parallel to an engine axis.

In another embodiment according to any of the previous embodiments, the platform is a vane outer platform. The spring land protrudes radially outward from the vane cover.

In another embodiment according to any of the previous embodiments, the platform extends axially from a forward end to an aft end. The spring land is between the forward and aft ends.

In another embodiment according to any of the previous embodiments, the platform is formed from a ceramic material.

In another embodiment according to any of the previous embodiments, the vane cover is formed from a metallic material.

The present disclosure may include any one or more of the individual features disclosed above and/or below alone or in any combination thereof.

DETAILED DESCRIPTION

Figure 1:
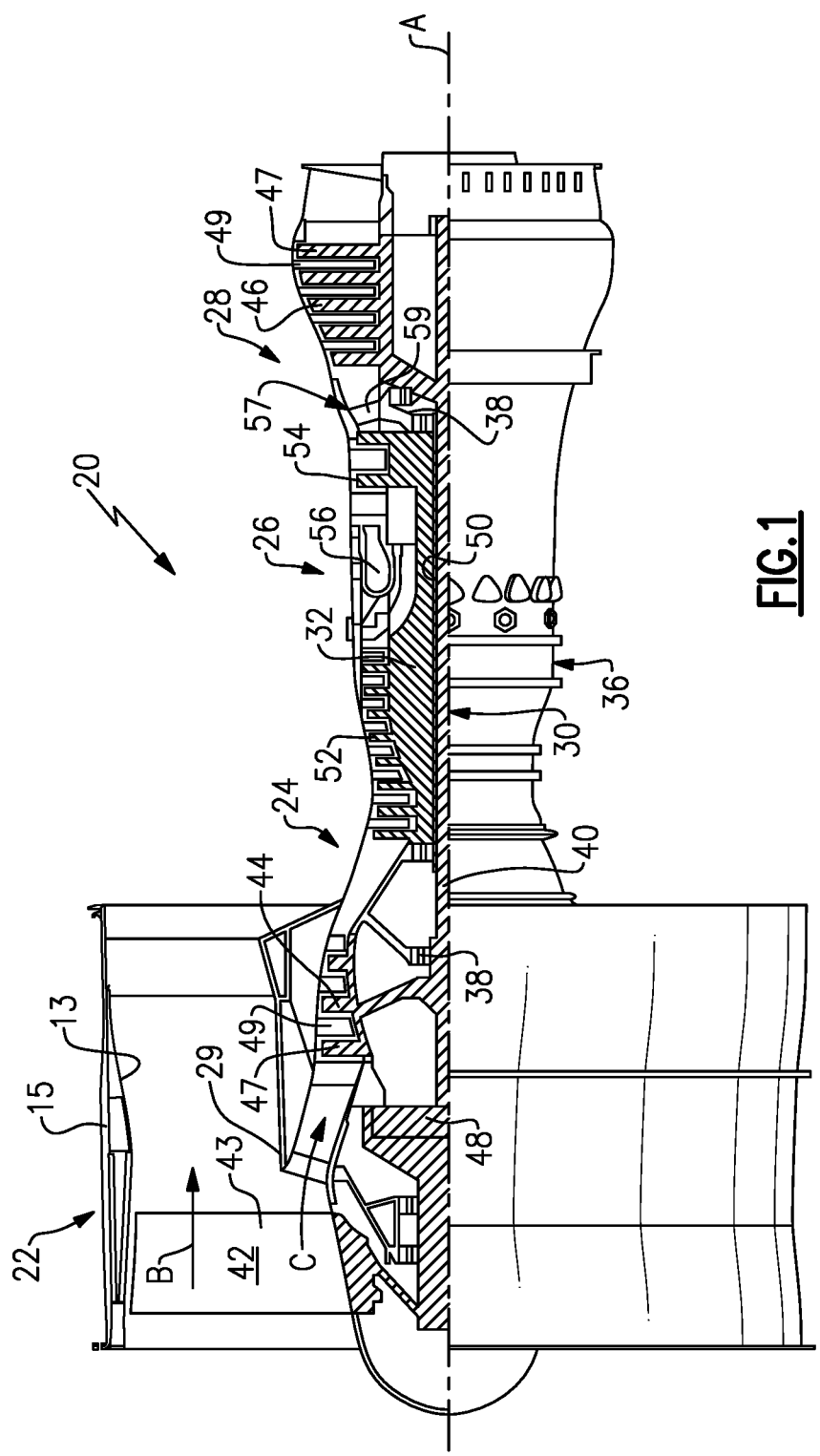
FIG. 1 schematically illustrates an example gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. The fan section 22 may include a single-stage fan 42 having a plurality of fan blades 43. The fan blades 43 may have a fixed stagger angle or may have a variable pitch to direct incoming airflow from an engine inlet. The fan 42 drives air along a bypass flow path B in a bypass duct 13 defined within a housing 15 such as a fan case or nacelle, and also drives air along a core flow path C for compression and communication into the combustor section 26 then expansion through the turbine section 28. A splitter 29 aft of the fan 42 divides the air between the bypass flow path B and the core flow path C. The housing 15 may surround the fan 42 to establish an outer diameter of the bypass duct 13. The splitter 29 may establish an inner diameter of the bypass duct 13. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures. The engine 20 may incorporate a variable area nozzle for varying an exit area of the bypass flow path B and/or a thrust reverser for generating reverse thrust.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects, a first (or low) pressure compressor 44 and a first (or low) pressure turbine 46. The inner shaft 40 is connected to the fan 42 through a speed change mechanism, which in the exemplary gas turbine engine 20 is illustrated as a geared architecture 48 to drive the fan 42 at a lower speed than the low speed spool 30. The inner shaft 40 may interconnect the low pressure compressor 44 and low pressure turbine 46 such that the low pressure compressor 44 and low pressure turbine 46 are rotatable at a common speed and in a common direction. In other embodiments, the low pressure turbine 46 drives both the fan 42 and low pressure compressor 44 through the geared architecture 48 such that the fan 42 and low pressure compressor 44 are rotatable at a common speed. Although this application discloses geared architecture 48, its teaching may benefit direct drive engines having no geared architecture. The high speed spool 32 includes an outer shaft 50 that interconnects a second (or high) pressure compressor 52 and a second (or high) pressure turbine 54. A combustor 56 is arranged in the exemplary gas turbine 20 between the high pressure compressor 52 and the high pressure turbine 54. A mid-turbine frame 57 of the engine static structure 36 may be arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

Airflow in the core flow path C is compressed by the low pressure compressor 44 then the high pressure compressor 52, mixed and burned with fuel in the combustor 56, then expanded through the high pressure turbine 54 and low pressure turbine 46. The mid-turbine frame 57 includes airfoils 59 which are in the core flow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of the low pressure compressor, or aft of the combustor section 26 or even aft of turbine section 28, and fan 42 may be positioned forward or aft of the location of gear system 48.

The low pressure compressor 44, high pressure compressor 52, high pressure turbine 54 and low pressure turbine 46 each include one or more stages having a row of rotatable airfoils. Each stage may include a row of vanes adjacent the rotatable airfoils. The rotatable airfoils are schematically indicated at 47, and the vanes are schematically indicated at 49.

The engine 20 may be a high-bypass geared aircraft engine. The bypass ratio can be greater than or equal to 10.0 and less than or equal to about 18.0, or more narrowly can be less than or equal to 16.0. The geared architecture 48 may be an epicyclic gear train, such as a planetary gear system or a star gear system. The epicyclic gear train may include a sun gear, a ring gear, a plurality of intermediate gears meshing with the sun gear and ring gear, and a carrier that supports the intermediate gears. The sun gear may provide an input to the gear train. The ring gear (e.g., star gear system) or carrier (e.g., planetary gear system) may provide an output of the gear train to drive the fan 42. A gear reduction ratio may be greater than or equal to 2.3, or more narrowly greater than or equal to 3.0, and in some embodiments the gear reduction ratio is greater than or equal to 3.4. The gear reduction ratio may be less than or equal to 4.0. The fan diameter is significantly larger than that of the low pressure compressor 44. The low pressure turbine 46 can have a pressure ratio that is greater than or equal to 8.0 and in some embodiments is greater than or equal to 10.0. The low pressure turbine pressure ratio can be less than or equal to 13.0, or more narrowly less than or equal to 12.0. Low pressure turbine 46 pressure ratio is pressure measured prior to an inlet of low pressure turbine 46 as related to the pressure at the outlet of the low pressure turbine 46 prior to an exhaust nozzle. It should be understood, however, that the above parameters are only exemplary of one embodiment of a geared architecture engine and that the present invention is applicable to other gas turbine engines including direct drive turbofans. All of these parameters are measured at the cruise condition described below.

A significant amount of thrust is provided by the bypass flow B due to the high bypass ratio. The fan section 22 of the engine 20 is designed for a particular flight condition—typically cruise at about 0.8 Mach and about 35,000 feet (10,668 meters). The flight condition of 0.8 Mach and 35,000 ft (10,668 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. The engine parameters described above, and those in the next paragraph are measured at this condition unless otherwise specified.

"Fan pressure ratio" is the pressure ratio across the fan blade 43 alone, without a Fan Exit Guide Vane ("FEGV") system. A distance is established in a radial direction between the inner and outer diameters of the bypass duct 13 at an axial position corresponding to a leading edge of the splitter 29 relative to the engine central longitudinal axis A. The fan pressure ratio is a spanwise average of the pressure ratios measured across the fan blade 43 alone over radial positions corresponding to the distance. The fan pressure ratio can be less than or equal to 1.45, or more narrowly greater than or equal to 1.25, such as between 1.30 and 1.40. "Corrected fan tip speed" is the actual fan tip speed in ft/sec divided by an industry standard temperature correction of $[(Tram\ ^\circ R)/(518.7^\circ R)]^{0.5}$. The corrected fan tip speed can be less than or equal to 1150.0 ft/second (350.5 meters/second), and can be greater than or equal to 1000.0 ft/second (304.8 meters/second).

Figure 2:
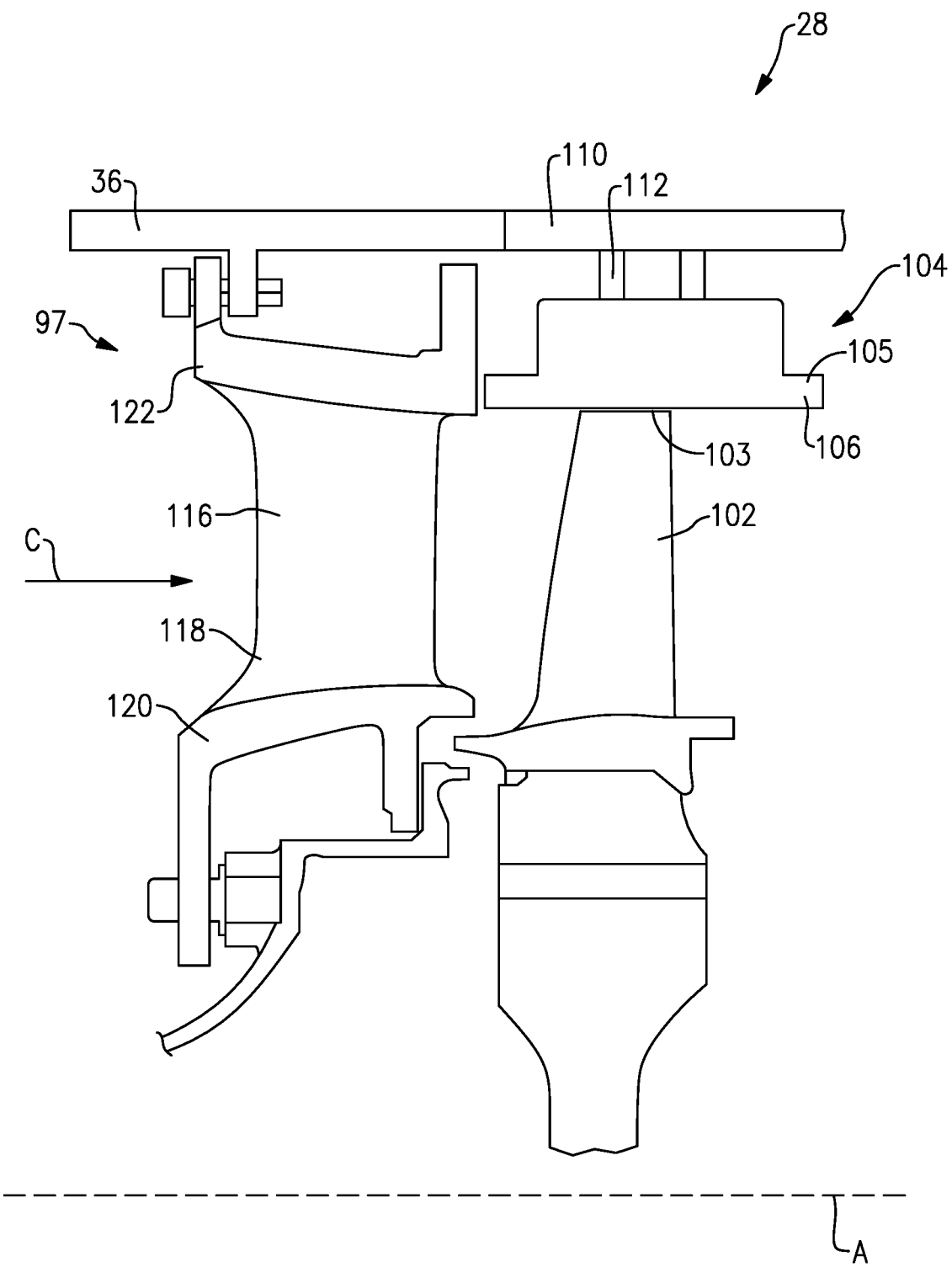
FIG. 2 schematically illustrates an example turbine section.

FIG. 2 shows a portion of an example turbine section 28, which may be incorporated into a gas turbine engine such as the one shown in FIG. 1. However, it should be understood that other sections of the gas turbine engine 20 or other gas turbine engines, and even gas turbine engines not having a fan section at all, could benefit from this disclosure. The turbine section 28 includes a plurality of alternating turbine blades 102 and turbine vanes 97.

A turbine blade 102 has a radially outer tip 103 that is spaced from a blade outer air seal assembly 104 with a blade outer air seal ("BOAS") 106. The BOAS 106 may be mounted to an engine case or structure, such as engine static structure 36 via a control ring or support structure 110 and a carrier 112. The engine structure 36 may extend for a full 360° about the engine axis A.

The turbine vane assembly 97 generally comprises a plurality of vane segments 118. In this example, each of the vane segments 118 has an airfoil 116 extending between an inner vane platform 120 and an outer vane platform 122. At least a portion of the outer vane platform 122 may be formed of a ceramic matrix composite ("CMC") material. The platform 122 is formed of a plurality of CMC laminate sheets. The laminate sheets may be silicon carbide fibers, formed into a braided or woven fabric in each layer. In other examples, the outer vane platform 122 may be made of a monolithic ceramic. CMC components such as vane platforms 120, 122 are formed by laying fiber material, such as laminate sheets or braids, in tooling, injecting a gaseous or melt infiltrant into the tooling, and reacting to form a solid composite component. The component may be further processed by adding additional material to coat the laminate sheets. CMC components may have higher operating temperatures than components formed from other materials. A radially stacked assembly may be arranged between the outer vane platform 122 and the engine static structure 36, as explained further herein.

In this disclosure, "generally axially" means a direction having a vector component in the axial direction that is greater than a vector component in the circumferential direction, "generally radially" means a direction having a vector component in the radial direction that is greater than a vector component in the axial direction and "generally circumferentially" means a direction having a vector component in the circumferential direction that is greater than a vector component in the axial direction.

Although an example turbine section 28 is shown, this disclosure may apply to the compressor section. Although an outer vane platform 122 is described, this disclosure may apply to other components, and particularly flow path components. For example, this disclosure may apply to combustor liner panels, shrouds, transition ducts, exhaust nozzle liners, blade outer air seals, or other CMC components. Further, although the outer vane platform 122 is generally shown and referenced, this disclosure may apply to the inner vane platform 120.

Figure 3:
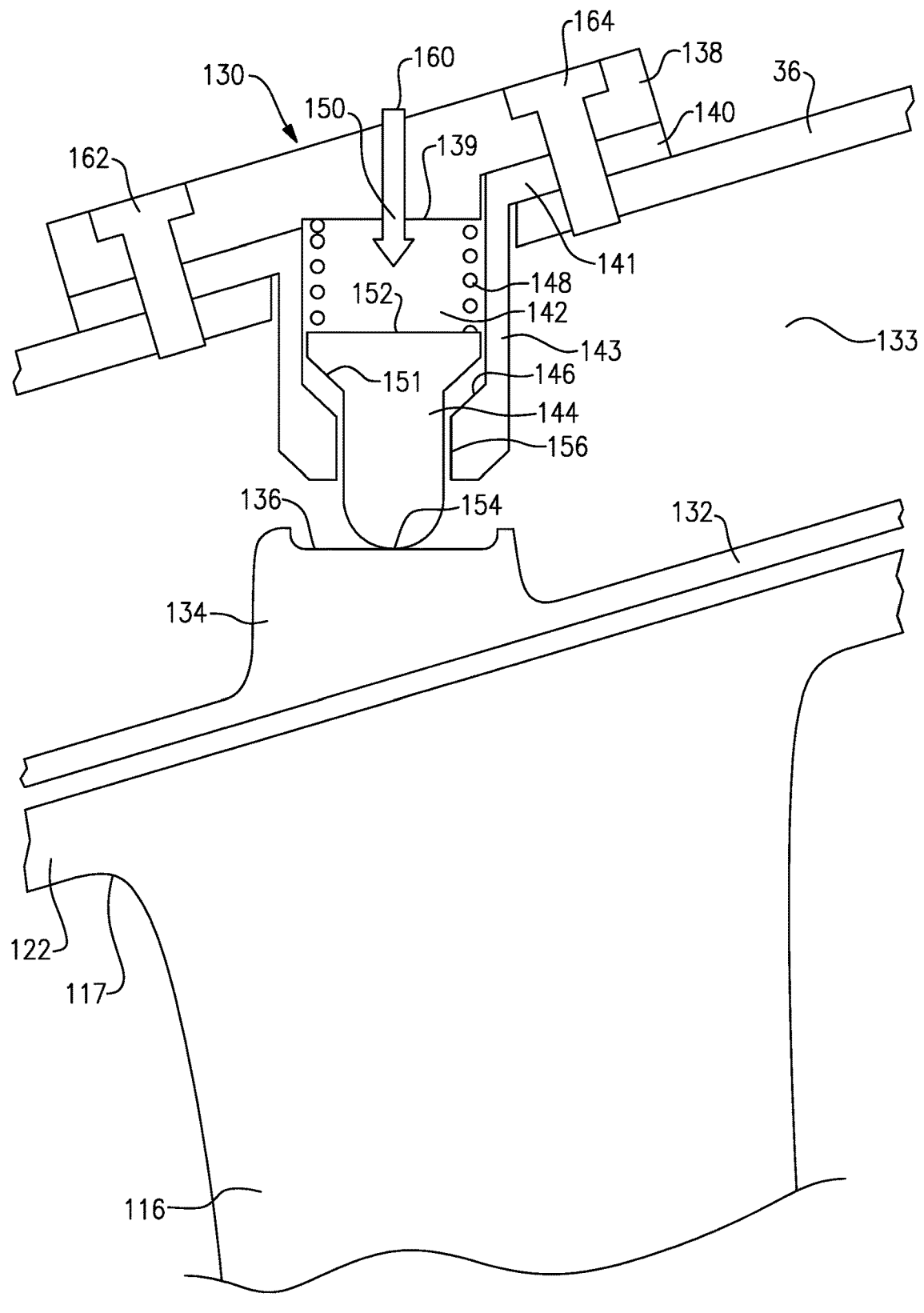
FIG. 3 schematically illustrates a portion of a vane ring assembly having a spring assembly according to an embodiment.

FIG. 3 illustrates a portion of the vane assembly 97. The platform 122 generally includes an outer portion 117 that forms the airfoil 116 and is exposed to the gas path. The outer portion 117 may be formed of a CMC material, for example. A vane support or cover 132 is arranged adjacent the portion 117. The vane cover 132 may be radially outward of the outer portion 117. The vane cover 132 may be a metallic material, for example. An engine structure, such as engine static structure 36 is arranged radially outward of the vane cover 132 and the outer portion 117. A cavity 133 is formed between the vane cover 132 and the engine static structure 36. One or more radially stacked components may be arranged within the cavity 133 for positioning and/or sealing the components. One such component, the spring assembly 130 is described further herein.

A spring assembly 130 is secured to an engine structure, such as the engine static structure 36. The spring assembly 130 generally has a spring housing 140, a spring 148, a plunger 144, and a spring cap 138. In the illustrated example, the spring housing 140 has an outer portion 141 that is secured to the engine static structure and a wall portion 143 that defines a spring cavity 142. The spring cavity 142 may be substantially cylindrical, for example.

The compression spring 148 and the plunger 144 are arranged within the spring cavity 142. Although the spring housing 140 is shown as separate from the engine structure 36, in other examples, the housing 140 could be integral with the engine structure 36. Although a coil spring is shown, the spring 148 may be another type of compression spring, such as a wave spring, for example.

The plunger 144 has an outer portion 152 and an inner portion 154. The outer portion 152 is arranged within the spring cavity 142 and is configured to engage the spring 148. The outer portion 152 may be substantially parallel to the engine axis A, for example. The spring housing 140 has an aperture 156 at a radially innermost portion of the housing 140. The inner portion 154 of the plunger 144 extends through the aperture 156 and is configured to contact a surface 136 of the vane cover 132. In one example, the aperture 156 has a smaller diameter than the outer portion 152 of the plunger 144. The plunger 144 has seating surface 151 between the outer portion 152 and the inner portion 154 that may seat against a surface 146 of the spring housing 140. The surface 146 extends about the aperture 156. The surfaces 146, 151 may be angled with respect to the engine axis A. In other examples, the surfaces 146, 151 may be substantially flat, or parallel to the engine axis A. The spring assembly 130 helps to bias the vane radially inward.

The spring assembly 130 is secured to the engine static structure 36 via a spring cap 138. The spring 148 is compressed between an inner surface 139 of the spring cap 138 and the outer surface 152 of the plunger 144. The spring cap 138 may be secured to the engine static structure 36 via bolts 162, 164, for example. Although bolts 162, 164 are shown, the spring cap 138 may be secured to the engine static structure in other ways, such as by welding, for example. The outer portion 141 of the spring housing 140 is arranged between the engine static structure 36 and the spring cap 138.

The vane cover 132 has a protrusion 134 that forms a seal land surface 136. The protrusion 134 extends radially outward from the vane cover 132. The vane cover 132 extends axially at an angle relative to the engine axis A. The seal land surface 136 is substantially parallel to the engine axis A. The compression spring 148 applies a force 160 on the plunger 144 in the radial direction that is substantially perpendicular to the engine central axis A, and surface 136. In this example, the surface 139 and outer portion 152 of the plunger 144 also extend perpendicular to the force 160, and thus parallel to the engine axis A. Arranging the seal land surface 136 perpendicular to the force 160 helps to prevent the components from shifting due to an axial component of the force 160. In the illustrated embodiment, the inner end 154 of the plunger 144 is rounded, which provides a point contact between the plunger 144 and the surface 136. In other examples, the inner end 154 may have other shapes, such as flat or polygonal, for example.

The spring assembly 130 may be located near a center of the vane support 132, for example. The spring assembly may be arranged near an airfoil stacking line, for example, to apply the force 160 at a center location. For example, the platform 122 has a length between the leading and trailing edges, and the spring assembly 130 and seal land surface 136 may be arranged between 25% and 75% of the axial distance. In some examples, a vane assembly may include more than one spring assembly 130. Such an arrangement provides for more preload on the components.

Some known radially stacked assemblies have a large gap from the accumulated tolerances of each component. The disclosed spring assembly ensures the components are biased inward and properly constrained. This may be particularly useful during assembly, idle, and engine shut-down conditions. The disclosed assembly may apply pre-loading, which reduces the gaps attributed to tolerances. Removing these radial gaps from tolerance stackups among components help ensure the vane assembly is properly stages prior to engine operation. The disclosed assembly may also apply resistive loading, which may help combat pressure loads within static hardware. The spring assembly may further bias platform seals in the vane assembly toward their respective sealing surface.

Although a combination of features is shown in the illustrated examples, not all of them need to be combined to realize the benefits of various embodiments of this disclosure. In other words, a system designed according to an embodiment of this disclosure will not necessarily include all of the features shown in any one of the figures or all of the portions schematically shown in the figures. Moreover, selected features of one example embodiment may be combined with selected features of other example embodiments.

Although an embodiment of this invention has been disclosed, a worker of ordinary skill in this art would recognize that certain modifications would come within the scope of this disclosure. For that reason, the following claims should be studied to determine the true scope and content of this disclosure.

The invention claimed is:

1. A vane assembly, comprising:
    an airfoil;
    a platform;
    a vane cover arranged adjacent the platform, the vane cover having a protrusion that provides a spring land, the spring land arranged at an angle relative to the vane cover; and
    a spring assembly having a plunger and a compression spring, the plunger in contact with the spring land, the compression spring compressed between a spring cap and the plunger, wherein the spring cap is secured to an engine static structure, a spring housing extends radially inward of the engine static structure to form a spring cavity that receives the compression spring, and the spring housing is secured to the engine static structure via the spring cap.

2. The vane assembly of claim 1, wherein the plunger is arranged partially within the spring cavity and extends through an aperture in the spring housing.

3. The vane assembly of claim 2, wherein the spring housing has a seating surface that extends about the aperture, the seating surface configured to engage a portion of the plunger.

4. The vane assembly of claim 3, wherein:
    the spring land provides a surface that is parallel to an engine axis, and the vane cover is non-parallel to the engine axis;
    the vane cover comprises a metallic material, and the platform comprises a ceramic matrix composite material.

5. The vane assembly of claim 4, wherein the spring housing includes a radially extending wall portion that establishes the spring cavity, the seating surface of the spring housing slopes from the wall portion towards the aperture, and the portion of the plunger includes a taper dimensioned to seat against the seating surface of the spring housing.

6. The vane assembly of claim 4, wherein the plunger includes a rounded end that contacts the spring land.

7. The vane assembly of claim 6, wherein the protrusion extends radially outwardly from a main body of the vane cover to a free end of the protrusion, and the free end of the protrusion includes a depression that establishes the spring land.

8. The vane assembly of claim 1, wherein the spring land provides a surface that is parallel to an engine axis.

9. The vane assembly of claim 1, wherein the platform is a vane outer platform, and the spring land protrudes radially outward from the vane cover.

10. The vane assembly of claim 1, wherein the platform is formed from a ceramic matrix composite material.

11. The vane assembly of claim 1, wherein the vane cover is formed from a metallic material.

12. A gas turbine engine, comprising:
    a compressor section;
    a combustor in fluid communication with the compressor section;
    a turbine section in fluid communication with the combustor;
    at least one of the turbine section or the compressor section comprising:
        a vane having an airfoil and a platform;
        a vane cover is arranged adjacent the platform defining a cavity between the vane cover and an engine static structure;
        a spring assembly secured to the engine static structure, the spring assembly extending into the cavity and having a plunger that contacts the vane cover;
        wherein the spring assembly comprises a compression spring compressed between a spring cap and the plunger, and the spring cap is secured to the engine static structure; and
        wherein a spring housing extends radially inward of the engine static structure to form a spring cavity that receives the compression spring, and the spring housing is secured to the engine static structure via the spring cap.

13. The gas turbine engine of claim 12, wherein the vane cover has a protrusion that provides a spring land, the plunger is in contact with the spring land.

14. The gas turbine engine of claim 13, wherein the spring land is arranged at an angle relative to the vane cover.

15. The gas turbine engine of claim 14, wherein the spring land has a surface that is parallel to an engine axis.

16. The gas turbine engine of claim 13, wherein the platform is a vane outer platform, and the spring land protrudes radially outward from the vane cover.

17. The gas turbine engine of claim 16, wherein the platform extends axially from a forward end to an aft end, and the spring land is between the forward and aft ends.

18. The gas turbine engine of claim 12, wherein the platform is formed from a ceramic matrix composite material.

19. The gas turbine engine of claim 17, wherein the platform comprises a ceramic matrix composite material, and wherein the vane cover comprises a metallic material.

20. The gas turbine engine of claim 12, wherein the vane cover is formed from a metallic material.

* * * * *